UNITED STATES PATENT OFFICE 2,464,885

CELLULOSE ESTER AND ETHER PRODUCTS COLORED WITH A DINITRO-PHENOXAZINE OR -PHENTHIAZINE

Henry Charles Olpin and Philip Broughton Law, Spondon, near Derby, England, assignors, by mesne assignments, to Celanese Corporation of America, a corporation of Delaware No Drawing. Application May 8, 1945, Serial No. 592,724

6 Claims. (Cl. 8—57)

This invention relates to coloured products, especially textile products, having a basis of cellulose acetate or other cellulose ester or ether.

According to the present invention cellulose acetate and other cellulose ester or ether products, especially textile products, are coloured with 1:3-dinitro-phenoxazine or 1:3-dinitro-phenthiazine of the respective formulae:

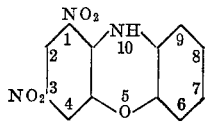 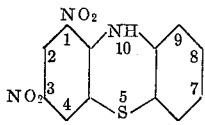

These compounds have good affinity for the cellulose acetate or other cellulose ester or ether when applied thereto as an aqueous dispersion. The resulting shades are golden orange and golden brown respectively and are non-phototropic and of very food fastness to light. The 1:3-dinitro-phenoxazine is somewhat superior to the 1:3-dinitro-phenthiazine both as regards affinity and fastness to light. Its dyeings resist 200 hours exposure to the carbon arc fadeometer.

We have found that other nitro-phenoxazines and other nitro-phenthiazines, especially those having a nitro group in the 1-position can be used to colour cellulose acetate and other cellulose ester or ether products but as a class they seem to have inferior affinity and/or inferior fastness to light. Further their shades are usually dull. Thus 1:3-dinitro-8:9-benzo-phenoxazine, 1:3-dinitro-7-hydroxyphenoxazine, 1:3-dinitro-8-amino-phenoxazine, and 1-nitro-phenoxazine-3-carboxylic anilide or meta-toluidide have very poor affinity for cellulose acetate. Again 1:3:6:8-tetranitro-phenoxazine, 1-nitro-3-methyl-phenoxazine, 1-nitro-3-chlor-phenoxazine, 1-nitro-3-methyl-phenthiazine, and 1-nitro-3-chlor-phenthiazine dye in dull red, pink or rubine shades of indifferent fastness to light.

The above-mentioned nitro, nitro-amino-o, methyl-nitro-, and methyl-chlor-nitro- derivatives can be obtained by condensing the appropriate o:o-dinitro-chlor-benzene derivative with the appropriate o-amino-phenol, o-aminonaphthol, or o-amino-thiophenol and subjecting the resulting nitro-diarylamine to the action of alkali. Thus 1:3-dinitro-phenoxazine can be obtained by mixing a hot solution of 5 parts by weight of picryl chloride in 32 parts by weight of methylated spirit with a hot solution of 2.2 parts of o-amino-phenol in 16 parts of methylated spirit and adding 16 parts of alcoholic caustic soda solution of 10 per cent strength.

The 1:3-dinitro-phenoxazine and 1:5-dinitro-phenthiazine are particularly useful for colouring cellulose acetate products. Other cellulose ester and ether products which can be coloured with their aid are products having a basis of cellulose formate, propionate, butyrate, acet-propionate or aceto-butyrate, or of ethyl or benzyl cellulose. The cellulose ester or ether products can be textile fibres (short lengths or continuous filaments) or foils, films, sheets, moulding powders or lacquers. Textile products, whether in yarn, fabric or other form, can consist of cellulose ester or ether fibres alone or cellulose ester or ether fibres in association with other textile fibres, for example wool, silk, cellulose fibres (natural or regenerated), polyamide fibres (e. g. fibres of the condensation products from adipic acid and hexamethylene diamine), and fibres of polymerized vinyl compounds (e. g. fibres of a co-polymerisation product of vinyl acetate and vinyl chloride). Of the above-mentioned other fibres, those of cellulose have substantially no affinity for the nitro-phenoxazines and nitro-phenthiazines while the remainder have affinity in varying degrees.

For the colouring of cellulose acetate textile materials the 1:3-dinitro-phenoxazine or 1:3-dinitro-phenthiazine can be applied uniformly or locally to the material in the form of aqueous dispersions prepared with the aid of soaps, sulphonated oils, sulphuric esters of long chain alcohols, sulphonated condensation products from naphthalene and formaldehyde, or other dispersing agents. The dispersing of the coloured compounds can be assisted by organic solvents therefor, especially water-soluble solvents. Pyridine has been found very useful for this purpose.

Again they may be applied in solution in organic liquids; for example they can be applied to cellulose acetate textiles as solutions in aqueous ethyl alcohol of 60–80 per cent strength by weight.

The invention includes colour preparations, whether in powder, paste, or other form, comprising 1:3-dinitro-phenoxazine or 1:3-dinitro-phenthiazine, together with a dispersing agent, for example one of those mentioned above. When such preparations are diluted with water, with, or without further dispersing agent, dispersions suitable for colouring cellulose ester or ether textiles are very readily obtained.

Coloured fibres of cellulose esters or ethers, and also coloured foils, films and the like can also be obtained by incorporating the 1:3-dinitro-compounds in solutions of the cellulose ester or ether and then shaping and setting the coloured solution in the required form. Thus continuous filaments can be formed from such coloured solutions by dry spinning methods.

The invention is illustrated by the following example in which the "parts" referred to are parts by weight:

*Example*

One part of 1:3-dinitro-phenoxazine is boiled with 10 parts of pyridine and 10 parts of turkey red oil stirred in while heating. The mixture is diluted with 100 parts of a boiling 2.5 grams per litre soap solution and then further diluted to 3000 parts with more 2.5 grams per litre soap solution to form a dye bath. A scoured cellulose acetate fabric (100 parts) is entered into the bath and dyeing effected for 1½ hours commencing at 20° C. and finishing at 75° C. The fabric is then washed off and dried. A golden-orange shade is obtained.

If the 1:3-dinitro-phenoxazine is replaced by 1:3-dinitro-phenthiazine a golden-brown shade is obtained.

Having described our invention, what we desire to secure by Letters Patent is:

1. A compound selected from the group consisting of cellulose esters and cellulose ethers colored with a compound of the formula

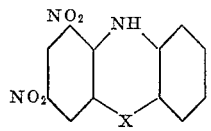

where X is an element selected from the group consisting of oxygen and sulfur.

2. Textile fibers of a compound selected from the group consisting of cellulose esters and cellulose ethers colored with a compound of the formula

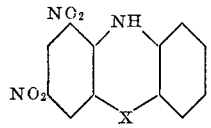

where X is an element selected from the group consisting of oxygen and sulfur.

3. Cellulose acetate fibres coloured with 1:3-dinitro-phenoxazine.

4. Cellulose aceate fibres coloured with 1:3-dinitro-phenthiazine.

5. Process for the coloration of fibres of a compound selected from the group consisting of cellulose esters and cellulose ethers, which comprises applying thereto an aqueous dispersion of the compound of the formula

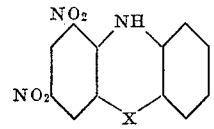

where X is an element selected from the group consisting of oxygen and sulfur.

6. Process for the coloration of cellulose acetate fibers, which comprises applying thereto an aqueous dispersion of the compound of the formula

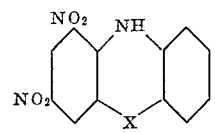

where X is an element selected from the group consisting of oxygen and sulfur.

HENRY CHARLES OLPIN.
PHILIP BROUGHTON LAW.

REFERENCES CITED

The following references are of record in the file of this patent:

UNITED STATES PATENTS

| Number | Name | Date |
|---|---|---|
| 2,005,303 | Spiegler | June 18, 1935 |
| 2,136,377 | Dinklage | Nov. 15, 1938 |
| 2,217,566 | Smith | Oct. 8, 1940 |
| 2,225,476 | Hess | Dec. 17, 1940 |

FOREIGN PATENTS

| Number | Country | Date |
|---|---|---|
| 275,752 | Great Britain | Aug. 18, 1927 |

OTHER REFERENCES

Chemical Abstracts, volume 6, page 364.

Certificate of Correction

Patent No. 2,464,885. March 22, 1949.

HENRY CHARLES OLPIN ET AL.

It is hereby certified that errors appear in the printed specification of the above numbered patent requiring correction as follows:

Column 1, line 20, for the word "food" read *good*; column 2, line 1, for "1:5-dinitro-" read *1:3-dinitro-*; line 6, for "acet-propionate" read *aceto-propionate*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*